US010294884B2

(12) United States Patent
Fritz et al.

(10) Patent No.: US 10,294,884 B2
(45) Date of Patent: May 21, 2019

(54) SYSTEM FOR CONTROLLING INJECTION OF FUEL IN ENGINE

(71) Applicant: General Electric Company, Schenectady, NY (US)

(72) Inventors: Jassin Marcel Fritz, Munich (DE); Dino Matthias Imhof, Munich (DE)

(73) Assignee: GE Global Sourcing LLC, Norwalk, CT (US)

(*) Notice: Subject to any disclaimer, the term of this patent is extended or adjusted under 35 U.S.C. 154(b) by 668 days.

(21) Appl. No.: 14/564,158

(22) Filed: Dec. 9, 2014

(65) Prior Publication Data

US 2016/0160791 A1    Jun. 9, 2016

(51) Int. Cl.
*B60T 7/12* (2006.01)
*F02D 41/30* (2006.01)
(Continued)

(52) U.S. Cl.
CPC ....... *F02D 41/3094* (2013.01); *F02D 35/027* (2013.01); *F02D 41/0025* (2013.01); *F02D 41/0027* (2013.01); *F02D 41/2467* (2013.01); *F02D 41/40* (2013.01); *F02D 19/061* (2013.01); *F02D 19/0647* (2013.01);
(Continued)

(58) Field of Classification Search
CPC ................. F02D 19/0607; F02D 41/40; F02D 2200/0618
USPC ............... 123/486, 434, 435, 472, 478, 180, 123/406.47; 73/114.49; 701/105, 103, 701/113
See application file for complete search history.

(56) References Cited

U.S. PATENT DOCUMENTS 5,012,786 A * 5/1991 Voss ....................... F02M 47/02
                                                              123/447
5,277,165 A * 1/1994 Matsuo ............... F02D 41/0002
                                                              123/308
(Continued)

FOREIGN PATENT DOCUMENTS

DE        19917772 A1    10/2000
DE    102010040622 A1     3/2012
(Continued)

OTHER PUBLICATIONS

European Search Report and Opinion issued in connection with corresponding EP Application No. 15196883.1 dated May 6, 2016.
(Continued)

*Primary Examiner* — John Kwon
(74) *Attorney, Agent, or Firm* — McCoy Russell LLP

(57) ABSTRACT

System for controlling an injection of fuel in an engine is disclosed. The engine includes a cylinder and a first fuel injector to inject a first fuel in the cylinder. The system includes a sensor disposed on or proximate to the first fuel injector and configured to generate an electrical signal indicative of at least one of a start of the injection and an end of the injection of the first fuel. The system further includes a controller configured to adjust at least one of a mass and the start of injection of the first fuel to be injected by the first fuel injector based on the electrical signal. A dual-fuel engine employing the system for controlling an injection of fuel in an engine is also disclosed. Moreover, method and non-transitory computer readable media for controlling an injection of the fuel are also disclosed.

23 Claims, 2 Drawing Sheets

Figure 1:
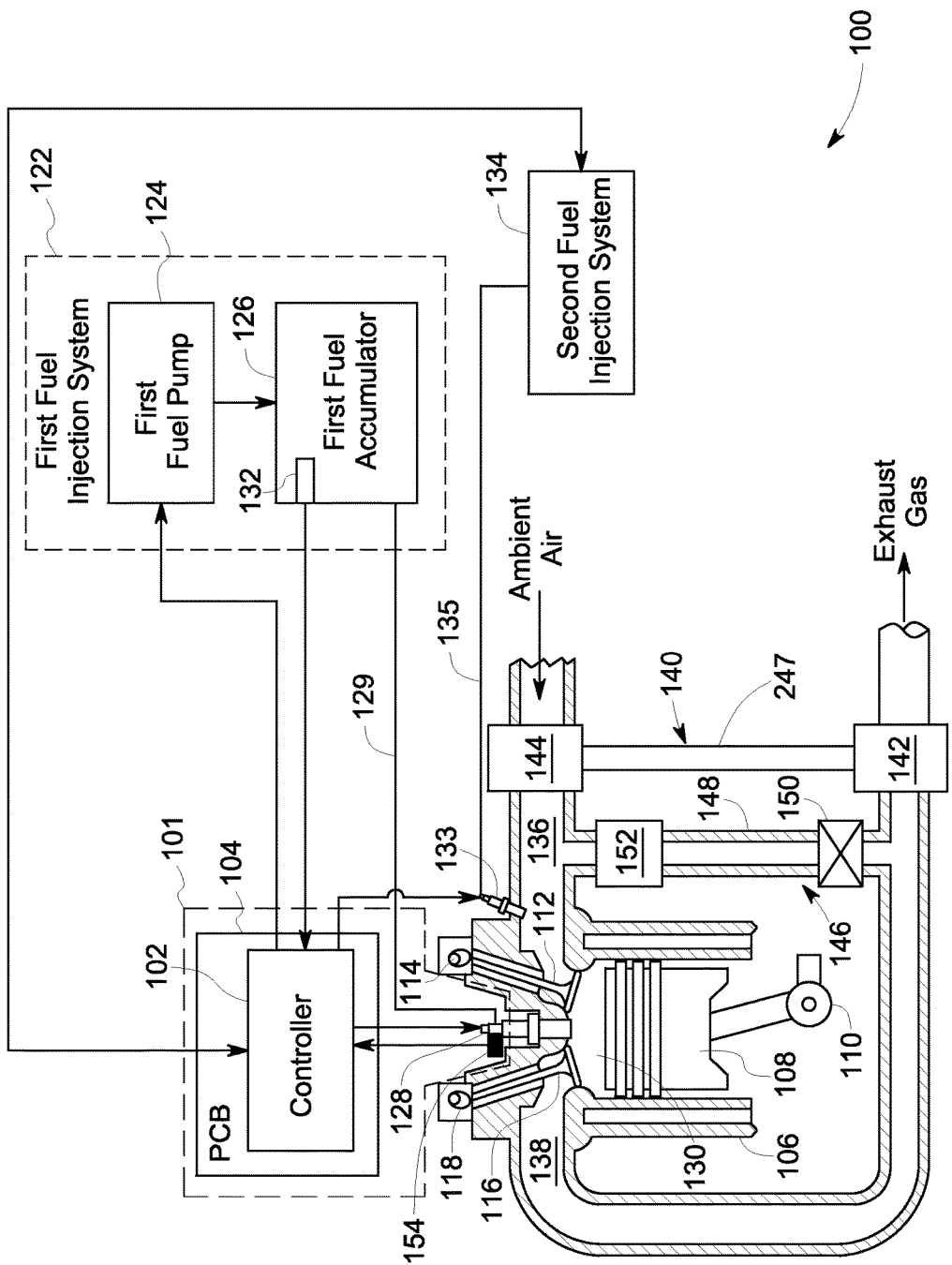

(51) Int. Cl.
*F02D 41/00* (2006.01)
*F02D 35/02* (2006.01)
*F02D 41/24* (2006.01)
*F02D 41/40* (2006.01)
*F02M 1/00* (2006.01)
*F02D 19/06* (2006.01)
*F02D 19/10* (2006.01)

(52) U.S. Cl.
CPC .......... *F02D 19/0692* (2013.01); *F02D 19/10* (2013.01); *Y02T 10/36* (2013.01); *Y02T 10/44* (2013.01)

(56) References Cited

U.S. PATENT DOCUMENTS

| | | |
|---|---|---|
| 5,297,520 A | 3/1994 | Danyluk |
| 5,739,417 A | 4/1998 | Grob et al. |
| 5,747,684 A * | 5/1998 | Pace ............... F02M 65/00 73/114.49 |
| 5,887,566 A | 3/1999 | Glauber et al. |
| 6,336,445 B1 * | 1/2002 | Yamazaki ............ F02M 59/366 123/456 |
| 6,499,991 B1 | 12/2002 | Usami et al. |
| 6,561,157 B2 | 5/2003 | Zur Loye et al. |
| 6,684,849 B2 | 2/2004 | Zur Loye et al. |
| 6,907,870 B2 | 6/2005 | Zur Loye et al. |
| 6,948,697 B2 * | 9/2005 | Herbert ............... F16K 31/0672 251/129.04 |
| 7,533,563 B2 * | 5/2009 | Horak ................. F02M 65/00 73/114.45 |
| 8,100,344 B2 * | 1/2012 | Kondo ................ F02M 47/027 123/480 |
| 8,306,719 B2 * | 11/2012 | Ishizuka ............. F02D 41/2474 123/456 |
| 8,671,911 B2 * | 3/2014 | Moren .................... F02B 69/04 123/305 |
| 2004/0173180 A1 * | 9/2004 | Strom ...................... F02B 1/12 123/299 |
| 2006/0101904 A1 * | 5/2006 | Brock ................. F02D 41/221 73/114.51 |
| 2009/0319157 A1 * | 12/2009 | Ishizuka ............. F02D 41/2474 701/106 |
| 2013/0255628 A1 * | 10/2013 | Moren .................... F02B 69/04 123/406.29 |

FOREIGN PATENT DOCUMENTS

| | | |
|---|---|---|
| DE | 102011089292 A1 | 6/2013 |
| EP | 2031231 A2 | 3/2009 |
| WO | 2006079172 A1 | 8/2006 |
| WO | 2007087685 A1 | 8/2007 |
| WO | 2008059376 A2 | 5/2008 |
| WO | 2014040606 A1 | 3/2014 |

OTHER PUBLICATIONS

Zhang et al., "The Studies of an Electronically Controlled CNG System for Dual Fuel Engines," SAE Technical Paper Series, Mar. 5-8, 2001, 10 Pages, Detroit, Michigan.

* cited by examiner

SYSTEM FOR CONTROLLING INJECTION OF FUEL IN ENGINE

BACKGROUND

Embodiments of the invention relate generally to engines. More particularly, embodiments of the invention relate to systems and methods for controlling an injection of fuel in an engine.

The reduction of fuel expenses and increasing fuel flexibility are some of the objectives in the development of reciprocating engines. Dual-fuel engines have been developed for addressing such objectives. The dual-fuel engines can also provide an advantage of reduced emissions in a dual-fuel combustion mode in comparison to single fuel diesel engines. Typically, a dual-fuel engine can be operated by two fuels: a first fuel and a second fuel. By way of example, the first fuel may include a liquid fuel such as diesel, biodiesel, heavy fuel oil (HFO), or combinations thereof. The second fuel may include a gaseous fuel such as ethanol, natural gas, bio-gas, liquefied petroleum gas, hydrogen, raw gas, associated gas, steel gas, or combinations thereof.

In the dual-fuel combustion mode of the dual-fuel engine, the liquid fuel (e.g., the first fuel) is used to ignite the gaseous fuel (e.g., the second fuel). The benefit of lower fuel costs of the gaseous fuels or lower emissions during the combustion of the gaseous fuels may increase with increasing contribution of the combustion of the gaseous fuels to the overall heat/energy release in dual-fuel combustion mode. The maximization of an energy fraction of the gaseous fuel requires the ability to inject a minimum amount of the first fuel. Moreover, while achieving good combustion stability and a desired cycle to cycle variation target, exact metering of the injected first fuel for the ignition of the second fuel becomes a challenge over the lifetime of the injector. This is in particular the case if only a single injector is used for the injection of the first fuel in the dual fuel operation as well as in a pure first fuel operation.

Therefore, there is a continuous need for improved systems and methods for controlling an injection of fuel in an engine.

BRIEF DESCRIPTION

One embodiment of the invention is directed to a system for controlling an injection of fuel in an engine. The engine includes a cylinder and a first fuel injector to inject a first fuel in the cylinder. The system includes a sensor disposed on or proximate to the first fuel injector and configured to generate an electrical signal indicative of at least one of a start of the injection and an end of the injection of the first fuel. The system further includes a controller configured to adjust at least one of a mass and the start of injection of the first fuel to be injected by the first fuel injector based on the electrical signal.

Another embodiment of the invention is directed to a dual-fuel engine. The dual-fuel engine includes a cylinder, a first fuel injector, a knock sensor, and a controller. The first fuel injector is mounted in a cylinder head of the cylinder and is configured to inject a first fuel in the cylinder. The knock sensor is disposed on or proximate to the first fuel injector. The knock sensor is configured to generate an electrical signal indicative of at least one of a start of injection and an end of injection of the first fuel. The controller is coupled to the first fuel injector and the knock sensor, where the controller is configured to adjust at least one of a mass and the start of the injection of the first fuel to be injected by the first fuel injector based on the electrical signal and one or more predefined characteristics associated with the first fuel injector.

Another embodiment of the invention is directed to a method for controlling an injection of a first fuel in a dual-fuel engine. The method includes injecting the first fuel via a first fuel injector into a cylinder of the dual-fuel engine. The method further includes generating an electrical signal by a sensor disposed on or proximate to the first fuel injector, wherein the electrical signal is indicative of at least one of a start of the injection and an end of the injection of the first fuel. Moreover, the method also includes adjusting at least one of a mass and the start of the injection of the first fuel to be injected based on the electrical signal and one or more calibration parameters associated with the first fuel injector.

Yet another embodiment of the invention is directed to a non-transitory computer readable media. The non-transitory computer readable media stores an executable code to perform a method of: enabling an injection of a fuel via a fuel injector into a cylinder of an engine; receiving an electrical signal, from a sensor disposed on or proximate to the fuel injector, indicative of at least one of a start of the injection and an end of the injection of the fuel; and adjusting at least one of a mass and the start of the injection of the fuel to be injected based on the electrical signal and one or more calibration parameters associated with the first fuel injector.

DRAWINGS

Figure 2:
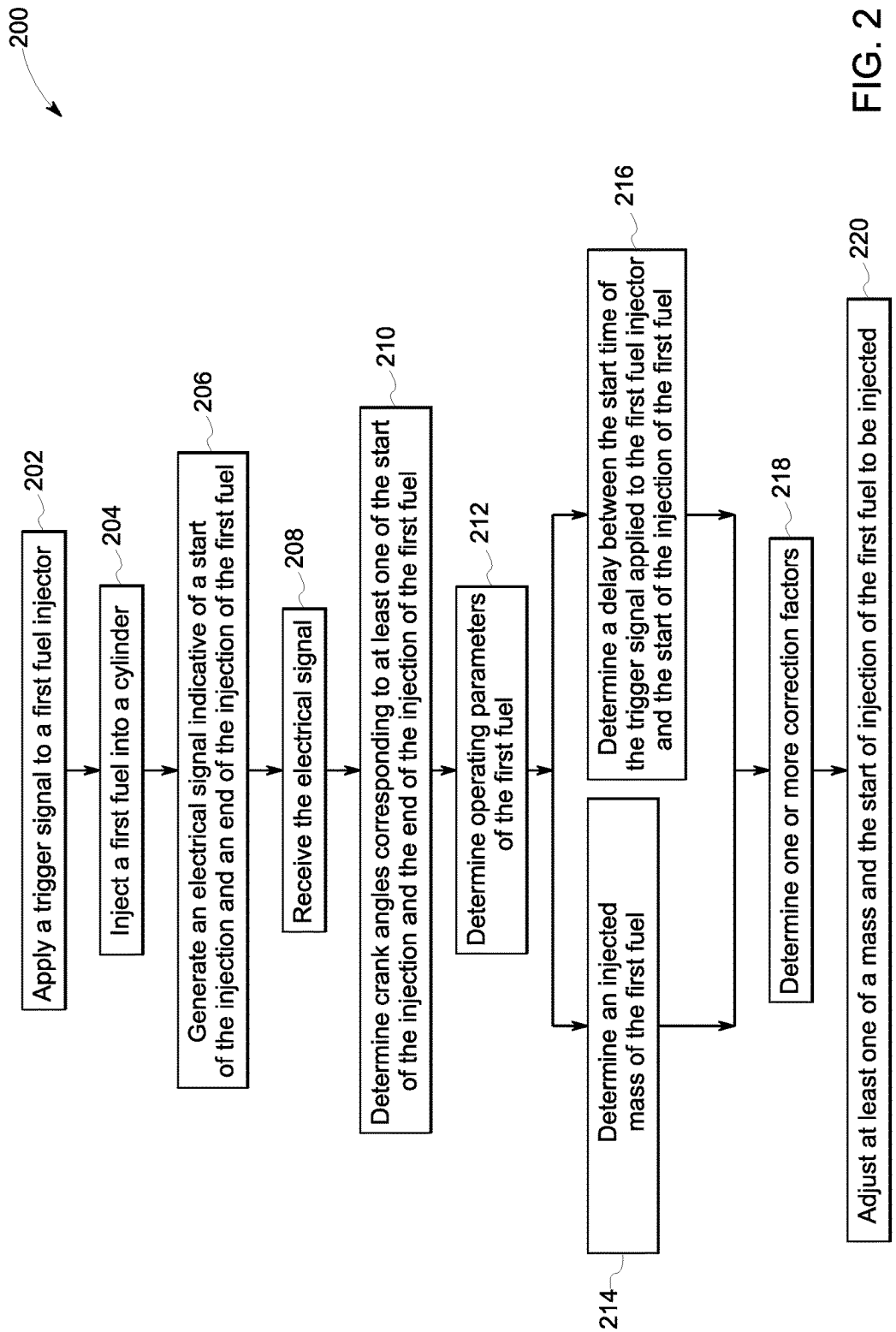

These and other features, aspects, and advantages of the present invention will become better understood when the following detailed description is read with reference to the accompanying drawings, in which like characters represent like parts throughout the drawings, wherein:

FIG. 1 illustrates a block diagram of an engine having a system for controlling an injection of fuel in an engine, in accordance with one embodiment of the invention; and FIG. 2 illustrates a flowchart of an example method for controlling an injection of fuel in an engine, in accordance with one embodiment of the invention.

DETAILED DESCRIPTION

The present disclosure may be best understood with reference to the figures and detailed description set forth herein. Various embodiments are discussed below with reference to the figures. However, those skilled in the art will readily appreciate that the detailed description given herein with respect to these figures is just for explanatory purposes as the system extends beyond the described embodiments.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. Here and throughout the specification and claims, range limitations may be combined and/or interchanged; such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

The following terms, unless otherwise indicated, shall be understood to have the following meanings:

The term "engine" as used herein may refer to a machine that converts one form of energy (for example, chemical energy) into mechanical energy so as to produce motion. Various examples of the engine include, but are not limited to, internal combustion engines and external combustions engines. Although various embodiments of the present invention have been illustrated with an example of an internal combustion engine, such as, a dual-fuel engine, the embodiments are applicable to other types of engines without limiting the scope of the present specification. The dual-fuel engine may be operated with two fuels—a first fuel and a second fuel.

The term "intake port" as used herein may refer to a portion of an intake air passage through which an ambient air enters into the cylinder of the engine.

The term "intake manifold" as used herein may refer to a portion of the intake air passage that supplies the ambient air to intake ports of a plurality of (e.g., a bank of) cylinders of the engine.

The term "common manifold" as used herein may refer to a portion of the intake air passage that supplies the ambient air to a plurality of intake manifolds. For example, in case of a V-series engine having two banks of cylinders, the common manifold may refer to a portion of the intake air passage that supplies the ambient air to the intake manifolds of both the two banks of cylinders.

The term "crank angle" as used herein may refer to an angular position of a crankshaft. The crank angle may be expressed in degrees of rotation of the crankshaft before a top-dead-center (TDC) position of a piston in the given cylinder.

The term "injection event" or "injection" as used herein may refer to single instance of injecting a fuel. The injection event may be characterized by a start of injection and an end of the injection.

The term "start of injection" as used herein may refer to an event when the fuel starts being injected into the cylinder.

The term "end of injection" as used herein may refer to an event when a fuel injection stops being injected into the cylinder.

The term "injected mass" as used herein may refer to a mass of the fuel that had been injected into the cylinder in one injection event.

The term "injection rate" as used herein may refer to a volume of the fuel being injected per unit time. In some embodiments of the invention, the injection rate may be measured in terms of $mm^3$/sec or $mm^3$/injection event.

The terms "knock" or "knocking event" as used herein may refer to an event caused due to an abnormal combustion of a fuel in the cylinder.

The term "electrical signal" as used herein may refer to one or more of a voltage or current signal.

The term "duration of a trigger signal" as used herein may refer to a period for which the trigger signal applied to a fuel injector is active (e.g., active low or active high) to cause the injection of the fuel.

The term "start time of the trigger signal" as used herein may refer to a time at which the trigger signal is applied to the fuel injector. In some embodiments of the invention, the start time of the trigger signal may be expressed in degrees of rotation of the crank shaft before the TDC position of a piston in the given cylinder.

The term "trigger signal" as used herein may refer to any of a voltage signal, or a current signal. In one embodiment of the invention, the trigger signal may be in an analog form or a digital form. The trigger signal may also be in the form of a pulse such as a current pulse or a voltage pulse. In some embodiments of the invention, the trigger signal may be in the form of a code.

The term "turn-down ratio", for a fuel injector (e.g., the first fuel injector), as used herein may refer to a relationship between a rated injection quantity of the fuel injector and an amount of the fuel being injected by the fuel injector in an injection event. For example, a turn down ratio of 100 for the fuel injector may indicate that the fuel injector is capable of injecting 1% of the rated injection quantity of the fuel injector. Similarly, a turn down ratio of 200 for the fuel injector may indicate that the fuel injector is capable of injecting 0.5% of the rated injection quantity of the fuel injector.

The term "high turn-down mode" as used herein may refer to a mode of operation of the fuel injector, such as the first fuel injector, when the fuel injector operates at higher turn-down ratios.

The term "substitution rate" as used herein may refer to a ratio of the amount of an energy imparted by the second fuel and the amount of energy imparted by the first fuel in a combustion event corresponding to a particular injection event.

The term "ballistic regime" as used herein may refer to an operation of the fuel injector when a needle of the fuel injector moves from a closed position towards a complete opening position, but is unable to reach the complete opening position and consequently returns to the closed position before having reached the complete opening position.

FIG. 1 illustrates a block diagram of an engine 100 having a system 101 for controlling an injection of fuel in the engine 100, in accordance with one embodiment of the invention. In the embodiment of FIG. 1, the engine 100 is depicted as a dual-fuel engine for the purpose of illustration. As will be appreciated, the embodiments of the invention may be applicable to other types of engines, such as, but not limited to single fuel engines and/or multi-fuel engines.

The engine 100 of FIG. 1 may be operated with two fuels—a first fuel and a second fuel. The first fuel may be a liquid fuel. Examples of the first fuel may include, but are not limited to, diesel, biodiesel, biomass to liquid (BTL), gas to liquid (GTL), heavy fuel oil (HFO), light cycle oil, gasoline, marine diesel oil, gasoil, or combinations thereof. The second fuel may be a gaseous fuel. Examples of the second fuel may include, but are not limited to, ethanol, natural gas, bio-gas, liquefied petroleum gas, hydrogen, raw gas, steel gas, or combinations thereof. For the description herein, it is assumed that the gaseous fuel being used as the second fuel is relatively inexpensive than liquid fuel being used as the first fuel.

In some embodiments of the invention, the engine 100 may be operated in a high turn-down mode of operation to take advantage of high contribution of the second fuel to the overall combustion. For example, in the high turn-down mode of operation, in every injection event, a mass of the first fuel being injected is substantially lower in comparison to the mass of the second fuel being injected. More particularly, in one example, the engine 100 may be operated to achieve turn-down ratio of 100 and more.

Furthermore, depreciation of a given fuel injector due to aging and/or wear, may lead to deviation in the amount of the corresponding fuel being injected. Especially, in the ballistic regime, the aging and/or wear may lead to the deviation that needs a correction to maintain the desired engine performance. Also, injector differences from cylinder to cylinder may require different corrections for each cylinder (note this might be the case even in a new engine).

In this regard, some embodiments of the invention are directed to a system for achieving a high turndown ratio by way of dynamically adjusting the mass and/or a start of the injection of the fuel such as the first fuel to be injected. More particularly, the engine 100 may be equipped with the system 101 (shown using a dashed region) configured for controlling an injection of the first fuel, in accordance with one embodiment of the invention. The system 101 may include a controller 102 and a sensor 154 operably coupled to the controller 102. The engine 100 may be controlled at least partially by the controller 102.

In one embodiment of the invention, the controller 102 may include a microprocessor, input/output ports, and a storage medium, such as, an electronic memory. Various examples of the microprocessor include, but are not limited to, a reduced instruction set computing (RISC) architecture type microprocessor or a complex instruction set computing (CISC) architecture type microprocessor. Further, the microprocessor may be of a single-core type or multi-core type. The storage medium may store computer readable instructions that are executable by the microprocessor for performing the methods described below as well as other variants that are anticipated but not specifically listed. In some embodiments of the invention, the controller 102 may be mounted on a printed circuit board (PCB) 104.

The engine 100 may include one or more cylinders. For the sake of brevity, only one cylinder 106 is described hereinafter. The cylinder 106 includes a piston 108 positioned therein. The piston 108 may be coupled to a crankshaft 110 such that a reciprocating motion of the piston 108 is translated into a rotational motion of the crankshaft 110. In one embodiment of the invention, the engine 100 may be a four-stroke engine. In another embodiment of the invention, the engine 100 may be a two-stroke engine.

Each cylinder, such as the cylinder 106, of the engine 100, may further include an intake valve 112 and an actuator 114 coupled to the intake valve 112. Furthermore, each cylinder, such as the cylinder 106, of the engine 100, may also include an exhaust valve 116 and an actuator 118 coupled to the exhaust valve 116. In the embodiment of FIG. 1, the cylinder 106 is shown including one intake valve 112 and one exhaust valve 116 located at an upper region of the cylinder 106. In some other embodiments of the invention, each cylinder of the engine 100 may include two or more intake valves and two or more exhaust valves located at an upper region of the cylinder. In some embodiments of the invention, the actuators 114 and 118 may be of an electric valve actuation type or cam actuation type, or a combination thereof, for example. The opening and closing of the intake valve 112 and the exhaust valve 116 may be controlled concurrently or based on any of variable intake cam timing, variable exhaust cam timing, dual independent variable cam timing, or fixed cam timing.

In some embodiments of the invention, the engine 100 may further include a first fuel injection system 122 for injecting the first fuel into the cylinder 106. The first fuel injection system 122 may include a first fuel tank (not shown), a first fuel pump 124, and a first fuel accumulator 126. The first fuel pump 124 may increase the pressure of the first fuel received from the first fuel tank. In one embodiment of the invention, the controller 102 may be configured to control the first fuel pump 124 in order to maintain/create a desired pressure of the first fuel. The first fuel pump 124 may be fluidly coupled to the first fuel accumulator 126. The first fuel pump 124 supplies the pressurized first fuel to the first fuel accumulator 126. The first fuel accumulator 126 may be configured to hold the pressurized first fuel.

The first fuel accumulator 126 is fluidly coupled to a first fuel injector 128 (of each cylinder). The fluid coupling between the first fuel accumulator 126 and the first fuel injector 128 is represented by a numeral 129. In some embodiments of the invention, in each cylinder, including the cylinder 106, the first fuel injector 128 may be arranged at a top position (i.e., in a cylinder head) as shown in FIG. 1. The controller 102 is coupled to the first fuel injector 128. In one embodiment of the invention, the controller 102 may be configured to determine duration and a start time of a trigger signal to be applied to the first fuel injector 128. The controller 102 may then communicate the trigger signal to the first fuel injector 128 to initiate a start of the injection of the first fuel. Based on the trigger signal received from the controller 102, the first fuel injector 128 may draw a desired mass of the first fuel from the first fuel accumulator 126 and injects the drawn first fuel into a combustion chamber 130 of the cylinder 106. Injected mass of the first fuel is proportional to the duration of the trigger signal.

In certain embodiments of the invention, the first fuel injector 128 may be of a common rail injector type that has an integrated accumulator to hold the first fuel for the injection in to the cylinder 106. The integrated accumulator may in turn be fluidly coupled to a high pressure line (e.g., a common rail) carrying the first fuel under pressure.

In one embodiment of the invention, the engine 100 may be configured to operate in the high turn-down mode. In the high turn-down mode, the controller 102 may be configured to modify the trigger signal such that the first fuel injector 128 injects reduced mass of the first fuel based on a desired substitution rate at a given turn-down ratio of the first fuel injector 128.

In some embodiments of the invention, the first fuel injection system 122 may also include a pressure sensor 132. The pressure sensor 132 may be disposed in the first fuel accumulator 126. The pressure sensor 132 may generate a first electrical signal indicative of an instantaneous pressure of the first fuel in the first fuel accumulator 126. The pressure sensor 132 may then send the first electrical signal to the controller 102. In some embodiments of the invention, the first fuel injection system 122 may also include a temperature sensor (not shown). The temperature sensor may be disposed in the first fuel injection system 122. More particularly, the temperature sensor may be disposed in the first fuel tank or the first accumulator 126. The temperature sensor may generate a signal indicative of an instantaneous temperature of the first fuel and communicate the signal to the controller 102.

The engine 100 may further include a second fuel injection system 134 for injecting a second fuel. The second fuel injection system 134 may also include, a second fuel tank (not shown), a second fuel pump (not shown), and a second fuel accumulator (not shown). The second fuel accumulator may be fluidly coupled to a second fuel injector 133. The fluid coupling between the second fuel accumulator and the second fuel injector 133 is represented by a numeral 135. In order to inject the second fuel, the second fuel injector 133 may be disposed into any of the cylinder, an intake port, an intake manifold (not shown), a common manifold (not shown), high pressure side of a turbocharger (described later), or low pressure side of the turbocharger (described later), without limiting the scope of the present specification. In some embodiments of the invention, when the second fuel injector 133 is disposed into any of the intake port, the intake manifold, the common manifold, the high pressure side of a turbocharger, or low pressure side of the turbocharger, the second fuel injector 133 may include a gas mixer.

The engine 100 may also include an intake port 136 that receives an ambient air from an air filter (not shown) that filters air from outside of the engine 100. The intake port 136 supplies an intake air for aiding combustion in the cylinder 106. The supply of the intake air to the cylinder 106 is controlled by the intake valve 112. Opening and closing of the intake valve 112 may be controlled by the controller 102 via the actuator 114.

Furthermore, the engine 100 may include an exhaust port 138 that receives combustion residues (e.g., an exhaust gas) from a combustion chamber 130 of the cylinder 106. The supply of the exhaust gas from the cylinder 106 is controlled by the exhaust valve 116. Opening and closing of the exhaust valve 116 may be controlled by the controller 102 via the actuator 118.

In some embodiments of the invention, the engine 100 also includes a turbocharger 140. The turbocharger 140 may be coupled to any of the intake port 136, the intake manifold, or the common manifold. The embodiment of FIG. 1 shows the turbocharger 140 coupled to the intake port 136. The turbocharger 140 may include a turbine 142 and a compressor 144. For example, FIG. 1 depicts the engine 100 with a turbocharger 140 including the compressor 144 arranged in the intake port 136, and the turbine 142 arranged along the exhaust port 138. The turbine 142 is operated by a flow of the exhaust gas. The compressor 144 may be at least partially powered by the turbine 142 via a shaft 247. The turbocharger 140 boosts air charge of the ambient air drawn into the intake port 136 in order to provide greater charge density during combustion to increase power output and/or engine-operating efficiency. The portion of the intake port 136 downstream of the compressor 144 may be referred to as the high pressure side of the turbocharger 140. Similarly, the portion of the intake port 136 upstream of the compressor 144 may be referred to as the high pressure side of the turbocharger 140. Although the embodiment described in FIG. 1 illustrates a turbocharger 140 including a single compressor and a single turbine, in other embodiments of the invention, the turbocharger 140 may also include multiple turbine and compressor stages or multiple single stage turbines and compressors.

Moreover, in some embodiments of the invention, the engine 100 may include an exhaust gas recirculation (EGR) system 146. The EGR system 146 is configured to route a portion of the exhaust gas from the exhaust port 138 upstream of the turbine 142 to the intake port 136 downstream of the compressor 144 of the turbocharger 140. The EGR system 146 includes an EGR passage 148 through which the exhaust gas may be re-circulated to the intake port 136. The EGR system 146 may also include an EGR valve 150 for controlling an amount of the exhaust gas that is re-circulated from the exhaust port 138 to the intake port 136. By introducing the exhaust gas to the cylinder 106 via the intake port 136, the amount of available intake oxygen for combustion is decreased, thereby reducing the combustion flame temperatures and reducing the formation of $NO_x$. The EGR valve 150 may be an on/off valve controlled by the controller 102, for example. In some embodiments of the invention, the EGR system 146 may further include an EGR cooler 152 to reduce the temperature of the exhaust gas before it enters the intake port 136. As shown in the example embodiment of FIG. 1, the EGR system 146 is a high-pressure EGR system. In other embodiments of the invention, the engine 100 may additionally or alternatively include a low-pressure EGR system. The low-pressure EGR system may be configured to route the exhaust gas from downstream of the turbine 142 to upstream of the compressor 144.

In order to aid in the control of the injection of the first fuel, the system 101 includes the sensor 154. In one embodiment of the invention, the sensor 154 may be disposed on the first fuel injector 128, as depicted in FIG. 1. In another embodiment of the invention, the sensor 154 may be disposed proximate to the first fuel injector 128. Examples of the sensor 154 may include, but are not limited to, an acoustic sensor, an acceleration sensor, a piezoelectric sensor, or a microphone. More particularly, a knock sensor may be used as the sensor 154.

In one embodiment of the invention, the sensor 154 may be configured to generate a second electrical signal indicative of at least one of a start of the injection and an end of the injection of the first fuel. In some embodiments of the invention, the second electrical signal may also be indicative of a knocking event. The sensor 154 may generate the second electrical signal for every injection event of the first fuel. In one embodiment of the invention, the sensor 154 may also generate a third electrical signal indicative of the health/condition of the first fuel injector 128. The sensor 154 is further configured to communicate the second and/or third electrical signals to the controller 102.

The controller 102 may be coupled to the sensor 154 via a wired (as shown in FIG. 1) or wireless medium. The controller 102 is configured to receive the second electrical signal and/or the third electrical signal from the sensor 154. The controller 102 may be configured to perform an analysis such as a frequency domain analysis (e.g., Fourier analysis) of the second and/or third electrical signal. The analysis of the third electrical signal, aids in condition based maintenance or onboard diagnostics.

Based on the analysis of the second electrical signal, the controller 102 may be configured to determine crank angles corresponding to at least one of the start of the injection and the end of the injection of the first fuel injected by the first fuel injector 128. Furthermore, the controller 102 may be configured to determine the injected mass of the first fuel based on the crank angles corresponding to the start of the injection and the end of the injection of the first fuel. It may be noted that the controller 102 may also consider values of one or more operating parameters, such as, the instantaneous pressure (e.g., determined based on the first electrical signal), density, and temperature of the first fuel to determine the injected mass of the first fuel. In some embodiments, the information on the instantaneous pressure may also be used by the controller 102 to detect the opening and closing time of the first fuel injector 128.

In some instances, there may be a deviation in the delay between the start time of the trigger signal applied to the first fuel injector 128 and the start of the injection of the first fuel due to aging and/or wear of the first fuel injector 128. Therefore, in one embodiment of the invention, the controller 102 may also be configured to determine a delay between the start time of the trigger signal applied to the first fuel injector 128 and the start of the injection of the first fuel.

Additionally, in some embodiments of the invention, during a training phase (alternatively referred to as a calibration phase), the controller 102 may be configured with calibration parameters by storing information corresponding to the calibration parameters in a memory (not shown) associated with the controller 102. In one embodiment of the invention, one or more of the calibration parameters may be determined based on component testing of the first fuel injector 128 and/or design specific characteristics, where the component testing is performed prior to installing the first fuel injector 128 in the engine 100. In another embodiment of the invention, the one or more of the calibration parameters may be determined during an engine test procedure. The calibration parameters include information related to one or more injector characteristics of a fuel injector, such as, the first fuel injector 128 and/or signal characteristics of the sensor (e.g., the sensor 154) for respective cylinder (e.g., the cylinder 106). As the one or more injector characteristics are specific to a single injector, an individual calibration of the controls for each injector in each cylinder may be facilitated. Examples of the one or more injector characteristics determined in injector testing (e.g., the component testing) or in the training phase may include, but are not limited to, the injected mass for specified conditions, the injection rate for the specified conditions, the start of the injection for a given start of the trigger signal at the specified conditions, the end of the injection of the first fuel injected by the first fuel injector 128 dependent on the start of the trigger signal and the duration of the trigger signal, duration of injection dependent on the duration of the trigger signal, the corresponding specified conditions, the delay between the start time of the trigger signal applied to the first fuel injector 128 and the start of the injection of the first fuel, or combinations thereof. Moreover, the calibration parameters may be defined with respect to the operating parameters of the first fuel.

In one embodiment, values of the calibration parameters may be stored with respect to the operating parameters of the first fuel in the form of one or more look-up tables in the memory. Moreover, in some embodiments of the invention, the controller 102 may be configured with one or more models (e.g., a mathematical model) or one or more transfer functions. The models or the transfer functions may be indicative of the relationship between one or more of the calibration parameters and the operating parameters. After the phase when the controller is preconfigured and/or the calibration phase, the controller 102 may include at least one of the one or more look-up tables, models, or transfer functions based on different values of one or more of the calibration parameters and the operating parameters.

In an operation of the engine 100 after the training/calibration phase is completed, to initiate an injection event, the controller 102 may be configured to apply the trigger signal to the first fuel injector 128. For the injection event, the sensor 154 may generate the second electrical signal indicative of the start of the injection and the end of the injection of the first fuel. The controller 102 may be configured to receive the second electrical signal from the sensor 154. In response to the second electrical signal, the controller 102 may be configured to adjust at least one of the mass and the start of the injection of the first fuel to be injected by the first fuel injector 128 based on the second electrical signal. The details of how the controller 102 adjusts the mass and/or the start of the injection of the first fuel are discussed in the description below.

The controller 102 may be configured to process the second electrical signal. The controller 102 may determine crank angles corresponding to the at least one of the start of the injection and the end of the injection of the first fuel injected by the first fuel injector 128 based on the processing of the second electrical signal. Additionally, the controller 102 may also determine the corresponding values of the operating parameters of the first fuel for the injection event. Furthermore, the controller 102 may be configured to determine of the injected mass of the first fuel based on the one or more of the operating parameters and the crank angles corresponding to the start of the injection and the end of the injection of the first fuel. Moreover, in one embodiment of the invention, the controller 102 may also be configured to determine the delay between the start time of the trigger signal applied to the first fuel injector 128 and the start of the injection of the first fuel.

In one embodiment of the invention, the controller 102 may be configured to determine a first correction factor to compensate for any deviation in the mass of the first fuel being delivered by the first fuel injector 128. The first correction factor may be indicative of a modification to be made in the duration of the trigger signal to be applied to the first fuel injector 128 for the next injection event of the first fuel.

In another embodiment of the invention, the controller 102 may be configured to determine a second correction factor to compensate for any deviation in the mass of the first fuel being delivered by the first fuel injector 128. The second correction factor may be indicative of a modification required in the pressure of the first fuel to be injected in the next injection event of the first fuel. More particularly, the second correction factor may be indicative of an amount by which the pressure of the first fuel in the first fuel accumulator 126 and/or the common rail (in case of the common rail injector type) is to be modified. In one embodiment, the second correction factor may be indicative of an amount by which the pressure of the first fuel in one or more components that hold or carry the first fuel under pressure is to be modified.

In yet another embodiment of the invention, the controller 102 may be configured to determine a third correction factor to compensate for any deviation in the start time of the injection of the first fuel. The third correction factor may be indicative of an amount of a delay or an advance required for the start time of the trigger signal to be applied to the first fuel injector 128 for the next injection event of the first fuel. In some embodiments of the invention, the controller 102 may be configured to determine all of the first, second, and third correction factors. The first, second, and third correction factors are hereinafter also collectively referred to as correction factors.

The controller 102 may determine the correction factors based on the calibration parameters determined in the calibration phase, the second electrical signal generated by the sensor 154, and/or the determined operating parameters of the first fuel for the injection event. More particularly, in addition to the calibration parameters and the determined values of operating parameters, information, such as, the determined values of the start of the injection, the end of the injection, the injected mass, and/or the injection rate of the first fuel, the delay between the start time of the trigger signal applied to the first fuel injector 128 and the start of the injection of the first fuel, derived from the second electrical signal may be used by the controller 102 to determine the correction factors. The controller 102 may be configured to compare predefined values (e.g., values of the calibration parameters determined in the calibration phase) with detected/determined values based on the second electrical signal from the sensor 154 (e.g. knocking sensor) to calculate the correction factors. For example, differences of the stored delay time between the end of current/trigger signal and the actual end of injection to the measured delay time may result in the corresponding correction factor that will be applied for the next injection event.

The controller 102 is configured to adjust the mass and/or the start of the injection of the first fuel based on one or more of the correction factors. In one embodiment of the invention, the controller 102 may be configured to modify at least one of the duration of the trigger signal to be applied to the first fuel injector 128 and the pressure of the first fuel in the fuel accumulator 126 to adjust the mass of the first fuel to be injected in the next injection event. In other embodiment of the invention, the controller 102 may be configured to modify the start time of trigger signal to be applied to the first fuel injector 128 to adjust the start of the injection of the first fuel. Therefore, by adaptively modifying at least one of the duration of the trigger signal, the start time of trigger signal, and the pressure of the first fuel, the performance of the first fuel injector 128 may be maintained similar to the performance when the first fuel injector 128 was newly installed in the engine 100.

FIG. 2 illustrates a flowchart 200 of a method for controlling injection of fuel in an engine such as the engine 100, in accordance with one embodiment of the invention. The flowchart 200 is explained in conjunction with FIG. 1. As previously noted, the engine 100 is configured with the system 101 that aids in controlling the injection of the fuel such as the first fuel. In a calibration phase, the controller 102 in the system 101 may be configured with one or more of calibration parameters, a data base (e.g. look-up tables), models, or transfer functions.

The method may start by applying a trigger signal to the first fuel injector 128 at step 202 to initiate an injection event of the first fuel. In one embodiment of the invention, duration and a start time of the trigger signal may be determined by the controller 102. Based on the applied trigger signal, the first fuel may be injected into the cylinder 106 of the engine 100, at step 204. The first fuel may be injected by the first fuel injector 128.

An electrical signal such as the second electrical signal indicative of the start of the injection and an end of the injection of the first fuel is generated as indicated at step 206. In one embodiment of the invention, the second electrical signal may be generated by a sensor such as the sensor 154 for an injection event. Thereafter, the second electrical signal may be received by the controller 102, at step 208.

At step 210, crank angles corresponding to at least one of the start of the injection and the end of the injection of the first fuel may be determined. In one embodiment of the invention, the crank angles may be determined by the controller 102 based on the second electrical signal.

Moreover, one or more operating parameters of the first fuel may also be determined at step 212. The operating parameters of the first fuel may include a type, a density, an instantaneous pressure, an instantaneous temperature of the first fuel. The term "type" of the first fuel as used herein may refer to an identity of the first fuel. For example, if the first fuel being used is diesel, the type of the first fuel is diesel. In one embodiment, the type and the density of the first fuel may be predefined. Alternatively, the controller 102 may be configured to determine the type and the density of the first fuel in conjunction with suitable sensors (not shown) disposed in the first fuel injection system 122. Further, the instantaneous pressure of the first fuel may be determined by the controller 102 based on the first electrical signal received from the pressure sensor 132. Moreover, the temperature of the first fuel may be determined by the controller 102 based on the signal received from the temperature sensor disposed in the first fuel injection system 122.

At step 214, injected mass of the first fuel injected by the first fuel injector 128 may be determined based on the crank angles determined at step 210 and the values of the operating parameters determined at step 212. Further, a delay between the start time of the trigger signal applied to the first fuel injector 128 and the start of the injection of the first fuel may be determined at step 216. The delay between the start time of the trigger signal applied to the first fuel injector 128 and the start of the injection of the first fuel may be determined by the controller 102 based on the start time of the trigger signal applied to the first fuel injector 128 at step 202 and the crank angle corresponding to the start of the injection of the first fuel determined at step 210. For example, the controller 102 may perform a comparison between the crank angle at which the trigger signal is applied to the first fuel injector 128 and the crank angle corresponding to the start of the injection of the first fuel to determine the delay. Although steps 214 and 216 are shown being executed in parallel in the example method of FIG. 2, steps 214 and 216 may also be performed in different orders without limiting the scope of the present specification.

At step 218, one or more correction factors may be determined. In one embodiment, the correction factors may be determined by the controller 102 based on one or more of the calibration parameters determined in the calibration phase, the second electrical signal generated by the sensor 154 (at step 206), and/or the operating parameters (determined at step 212) of the first fuel for the injection event. More particularly, in addition to the calibration parameters and the determined values of operating parameters, information, such as, the determined values of the start of the injection, the end of the injection, the injected mass, and/or the injection rate of the first fuel, the delay between the start time of the trigger signal applied to the first fuel injector 128 and the start of the injection of the first fuel, derived from the second electrical signal may be used by the controller 102 to determine the correction factors. The controller 102 may be configured to compare predefined values (e.g., values of the calibration parameters determined in the calibration phase) with detected/determined values based on the second electrical signal from the sensor 154 (e.g. knocking sensor) to calculate the correction factors. In a non-limiting example, three correction factors—first, second, and third correction factors may be determined by the controller 102.

Subsequent to the determination of the correction factors, for a subsequent injection event, at least one of a mass and a start of the injection of the first fuel is adjusted at step 220 based on the one or the correction factors. In one embodiment of the invention, based on the first correction factor, the duration of the trigger signal to be applied to the first fuel injector 128 may be modified by the controller 102 to adjust the mass of the first fuel to be injected in a next injection event. In another embodiment of the invention, based on the second correction factor, the pressure of the first fuel inside the first fuel accumulator 126 may be modified by the controller 102 to adjust the mass of the first fuel to be injected in the next injection event. For example, the controller 102 may modify a signal or a command applied to the first fuel pump 124 in order to modify the pressure of the first fuel inside the first fuel accumulator 126. In yet another embodiment of the invention, based on the third correction factor, the start time of the trigger signal to be applied to the first fuel injector 128 may be delayed or advanced by the controller 102 to adjust the start of injection of the first fuel for the next injection event.

Any of the foregoing steps and/or system elements may be suitably replaced, reordered, or removed, and additional steps and/or system elements may be inserted, depending on the needs of a particular application, and that the systems of the foregoing embodiments may be implemented using a wide variety of suitable processes and system elements and are not limited to any particular computer hardware, software, middleware, firmware, microcode, etc.

Furthermore, the foregoing examples, demonstrations, and method steps such as those that may be performed by the controller 102 may be implemented by suitable code on a processor-based system, such as a general-purpose or special-purpose computer. Different implementations of the systems and methods may perform some or all of the steps described herein in different orders, parallel, or substantially concurrently. Furthermore, the functions may be implemented in a variety of programming languages, including but not limited to C++ or Java. Such code may be stored or adapted for storage on one or more tangible or non-transitory computer readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

The non-transitory computer readable media stores an executable code to perform method of enabling an injection of a fuel (e.g., the first fuel) via the first fuel injector 128 into the cylinder 103 of an engine 100; receiving an electrical signal such as the second electrical signal, from the sensor 154 disposed on or proximate to the first fuel injector 128, indicative of at least one of a start of the injection and an end of the injection of the fuel; and adjusting a mass and/or the start of the injection of the fuel to be injected based on the electrical signal and one or more calibration parameters associated with the first fuel injector 128.

In accordance with some embodiments of the invention, the described systems and techniques may result in overall reduction in the costs. This may be effected in part due to an adaptive control of the injection of a fuel. Such control of the injection of the first fuel may at least partially compensate the effects of aging and/or wear of a fuel injector thereby achieving a desired mass of the fuel to be injected in the injection event.

The present invention has been described in terms of some specific embodiments. They are intended for illustration only, and should not be construed as being limiting in any way. Thus, it should be understood that modifications can be made thereto, which are within the scope of the invention and the appended claims.

It will be appreciated that variants of the above disclosed and other features and functions, or alternatives thereof, may be combined to create many other different systems or applications. Various unanticipated alternatives, modifications, variations, or improvements therein may be subsequently made by those skilled in the art and are also intended to be encompassed by the following claims.

The invention claimed is:

1. A system for controlling an injection of fuel in an engine, the engine having a cylinder and a first fuel injector to inject a first fuel in the cylinder, the system comprising:
   a sensor disposed directly on the first fuel injector; and
   a controller configured to:
      determine at least one of a first start of injection and a first end of injection of the first fuel for a first injection event of the first fuel based on an electrical signal output by the sensor; and
      adjust at least one of a mass and a second start of injection of the first fuel to be injected by the first fuel injector in a second, later fuel injection event based on the first start of injection and/or the first end of injection of the first fuel injection event relative to one or more calibration parameters.

2. The system of claim 1, wherein the first fuel comprises diesel, biodiesel, biomass to liquid (BTL), gas to liquid (GTL), heavy fuel oil, light cycle oil, gasoline, marine diesel oil, gasoil, or combinations thereof.

3. The system of claim 1, wherein the engine is a dual-fuel engine comprising a second fuel injector to inject a second fuel into the cylinder, an intake port, an intake manifold, a common manifold, high pressure side of a turbocharger, or low pressure side of the turbocharger.

4. The system of claim 1, wherein the sensor comprises at least one of an acoustic sensor, an acceleration sensor, or a piezoelectric sensor.

5. The system of claim 1, wherein the sensor is a knock sensor.

6. The system of claim 1, wherein the controller is further configured to determine, based on the electrical signal output by the sensor, a crank angle corresponding to the at least one of the first start of the injection and the first end of the injection of the first injection event.

7. The system of claim 6, wherein the controller is further configured to determine one or more operating parameters of the first fuel, wherein the one or more operating parameters comprise a type of the first fuel, a temperature of the first fuel, or combination thereof.

8. The system of claim 7, wherein the controller is further configured to determine an injected mass of the first fuel in the first injection event based on the determined crank angle and the one or more operating parameters of the first fuel.

9. The system of claim 8, wherein the controller is further configured to determine one or more correction factors for adjusting at least one of the mass and the first start of the injection of the first fuel, wherein the one or more correction factors are determined based on the one or more calibration parameters, the determined crank angle, the one or more operating parameters of the first fuel, or combinations thereof.

10. The system of claim 9, wherein the one or more calibration parameters are defined with respect to the one or more operating parameters of the first fuel, and wherein one or more calibration parameters comprise information related to one or more injector characteristics of the first fuel injector and signal characteristics of the sensor with respect to the one or more operating parameters of the first fuel.

11. The system of claim 10, wherein the one or more injector characteristics comprise at least one of the injected mass for specified conditions, an injection rate for the specified conditions, the first start of the injection for a given start of a trigger signal at the specified conditions, the first end of the injection of the first fuel injected by the first fuel injector dependent on the start of the trigger signal and a duration of the trigger signal, a duration of injection dependent on the duration of the trigger signal, a delay between a start time of the trigger signal applied to the first fuel injector and the first start of the injection of the first fuel, or combinations thereof.

12. The system of claim 11, wherein the controller is further configured to modify at least one of:
the duration of the trigger signal to be applied to the first fuel injector during the second injection event based on at least one of the one or more correction factors to adjust the mass of the first fuel, and wherein the mass of the first fuel to be injected by the first fuel injector during the second injection event is dependent on the duration of the trigger signal; and
the start time of the trigger signal based on at least one of the one or more correction factors to adjust the first start of the injection of the first fuel.

13. The system of claim 9, wherein the controller is further configured with at least one of one or more look-up tables, one or more models, or one or more transfer functions relating values of the one or more calibration parameters and the one or more operating parameters.

14. A dual-fuel engine, comprising:
a cylinder;
a first fuel injector mounted in a cylinder head of the cylinder and configured to inject a first fuel in the cylinder;
a knock sensor disposed on the first fuel injector and configured to generate an electrical signal indicative of at least one of a start of injection and an end of injection of the first fuel for a first injection event of the first fuel; and
a controller coupled to the first fuel injector and the knock sensor, wherein the controller is configured to adjust at least one of a mass and start of the injection of the first fuel to be injected in a later, second injection event of the first fuel by the first fuel injector based on the electrical signal and one or more predefined characteristics associated with the first fuel injector.

15. The dual-fuel engine of claim 14, wherein the electrical signal is a first electrical signal and wherein the controller is configured to detect a knocking event based on a second electrical signal output by the knock sensor.

16. The dual-fuel engine of claim 14, further comprising a second fuel injector to inject a second fuel into the cylinder, an intake port, an intake manifold, a common manifold, high pressure side of a turbocharger, or low pressure side of the turbocharger.

17. A method for controlling an injection of a first fuel in a dual-fuel engine, the method comprising:
injecting the first fuel via a first fuel injector into a cylinder of the dual-fuel engine;
generating an electrical signal by a sensor disposed on the first fuel injector, wherein the electrical signal is indicative of at least one of a start of the injection and an end of the injection of the first fuel for every injection event of the first fuel; and
adjusting at least one of a mass and the start of the injection of the first fuel to be injected based on the electrical signal and one or more calibration parameters associated with the first fuel injector.

18. The method of claim 17, further comprising determining at least one of the one or more calibration parameters or characteristics of the sensor during at least one of a component testing of the first fuel injector and an engine test procedure.

19. The method of claim 17, further comprising determining, based on the electrical signal, crank angles corresponding to at least one of the start of the injection and the end of the injection of the first fuel.

20. The method of claim 19, further comprising determining, based on the crank angles, a delay between a start of a trigger signal and the start of injection.

21. The method of claim 19, further comprising determining an injected mass of the first fuel injected by the first fuel injector based on at least one of the crank angles, the one or more calibration parameters, or one or more operating parameters of the first fuel.

22. The method of claim 20, further comprising:
determining one or more correction factors, wherein the one or more correction factors are determined based on at least one of the one or more calibration parameters, the one or more operating parameters, and the delay between the start of the trigger signal and the start of injection; and
modifying at least one of a duration of the trigger signal, and the start of the trigger signal to be applied to the first fuel injector based on the one or more correction factors.

23. A non-transitory computer readable media storing an executable code to perform a method of:
enabling an injection of a fuel via a fuel injector into a cylinder of an engine;
receiving an electrical signal, from a sensor disposed on the fuel injector, indicative of at least one of a start of the injection and an end of the injection of the fuel for every injection event of the first fuel; and
adjusting at least one of a mass and the start of the injection of the fuel to be injected based on the electrical signal and one or more calibration parameters associated with the fuel injector.

* * * * *